June 1, 1937.   J. D. WICKS ET AL   2,081,968
LIQUID FILTER
Filed Aug. 2, 1932   2 Sheets-Sheet 1
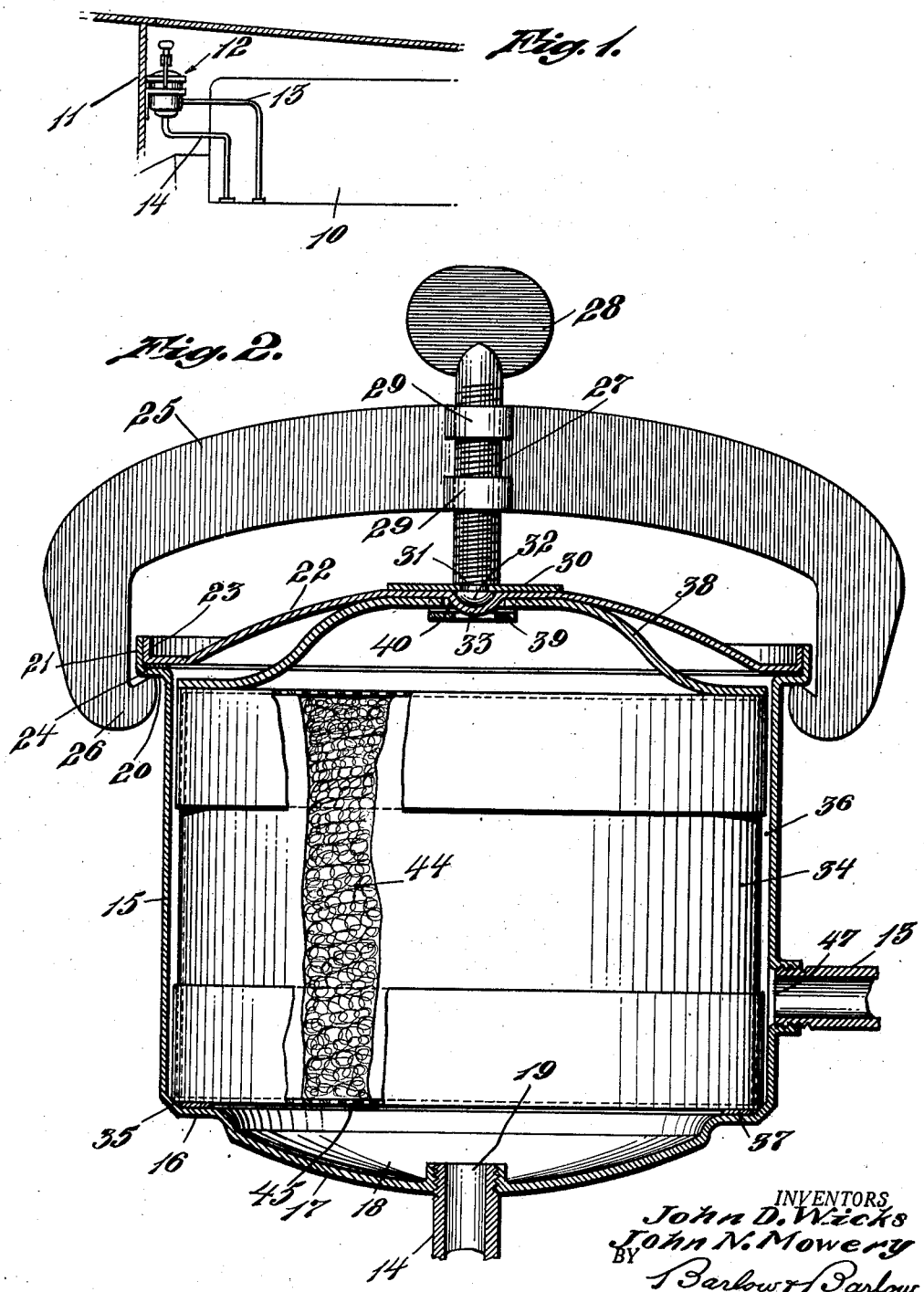
INVENTORS
John D. Wicks
John N. Mowery
BY Barlow & Barlow
ATTORNEYS.

June 1, 1937.  J. D. WICKS ET AL  2,081,968
LIQUID FILTER
Filed Aug. 2, 1932   2 Sheets-Sheet 2
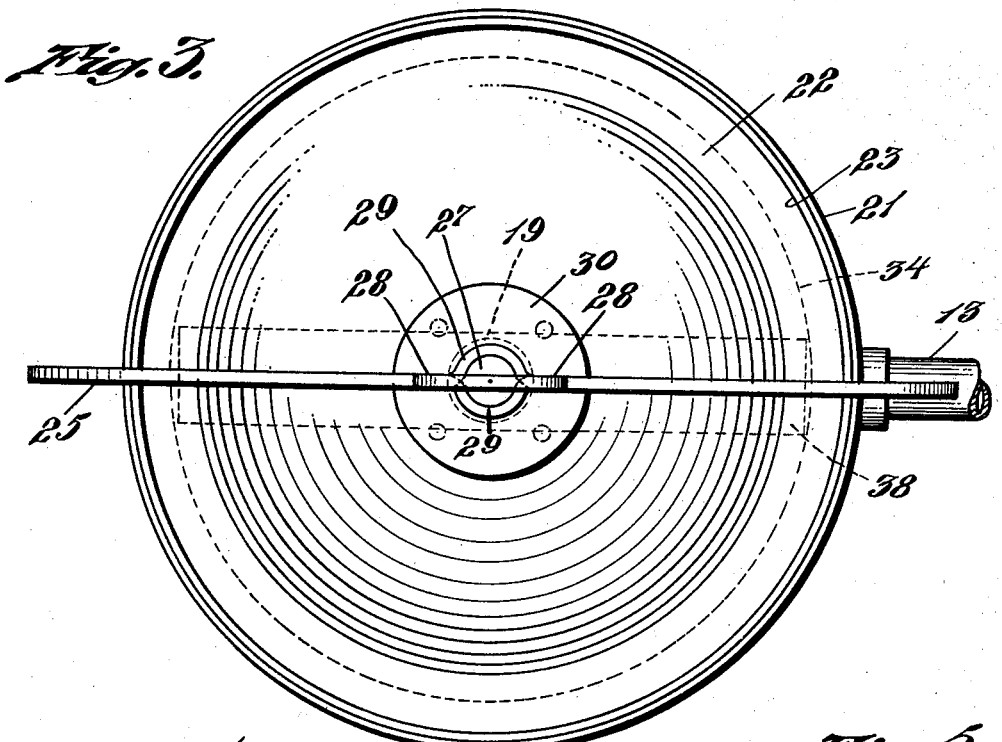
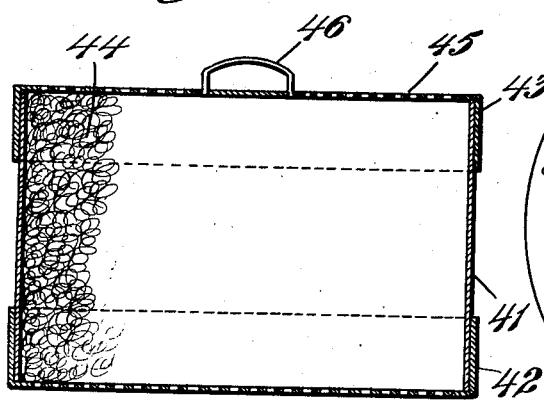
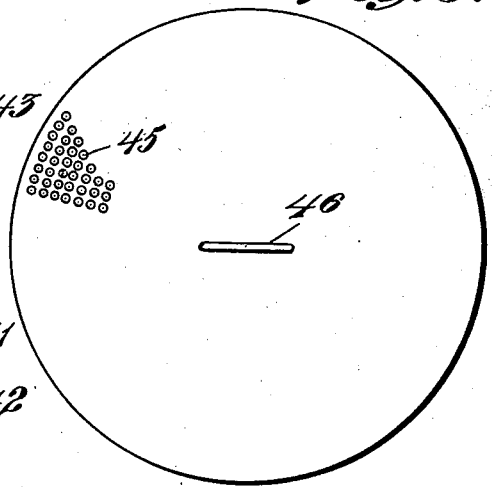
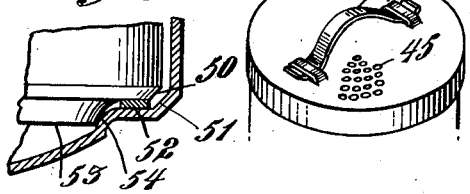
INVENTORS
*John D. Wicks*
*John N. Mowery*
BY *Barlow & Barlow*
ATTORNEYS.

Patented June 1, 1937

2,081,968

UNITED STATES PATENT OFFICE 2,081,968

LIQUID FILTER

John D. Wicks, Little Compton, R. I., and John N. Mowery, Worcester, Mass.; said Mowery assignor to T. Edward Aldham, Providence, R. I., and said Wicks assignor to Charles H. Eden, Providence, R. I.

Application August 2, 1932, Serial No. 627,230

4 Claims. (Cl. 210—131)

This invention relates to a liquid filter, more particularly for the filtering of crank case oil of a motor vehicle, and has for one of its objects a construction by which the impurities, such as carbon, may be removed from the oil passing therethrough and collected in a cartridge of filtering material which may be readily removed from a casing and replaced by the fresh cartridge.

Another object of the invention is the provision of a construction by which the pressure of the oil as it passes through the casing will assist in sealing the cartridge at its juncture with the casing so as to positively direct the oil through the cartridge.

Another object of the invention is the provision of resilient means for forcing the cartridge toward its sealing seat, which means will be removed with the cover of the casing in removing the cartridge from position.

Another object of the invention is the provision of means for centering the cartridge in the casing that a peripheral chamber will be left about the cartridge between it and the casing.

Another object of the invention is the provision of a clamp which may be formed as a unit with the cover that it may be detached from the casing with the cover.

A further object of the invention is the provision of means for centering the spring or resilient means which forces the cartridge into the casing.

A still further object of the invention is the provision of sealing seats for the cover and cartridge by deflection of the stock of the casing and utilization of the deflection for providing the cover seat to also provide an abutment co-acting with a clamp to secure the cover in position.

With these and other objects in view the invention consists of certain novel features of construction as will be more fully described and particularly pointed out in the appended claims.

In the accompanying drawings:—

Fig. 1 is a fragmental diagrammatic view illustrating a portion of a motor vehicle with our liquid filter mounted on the dash thereof beneath the hood.

Fig. 2 is a central sectional view through the filter with parts of the cartridge broken away to show the interior thereof.

Fig. 3 is a top plan view of the casing.

Fig. 4 is a sectional view of the cartridge.

Fig. 5 is a top plan view of the cartridge showing the perforations in the top wall thereof.

Fig. 6 is a perspective of the top of a modified form of cartridge showing the resilient means or spring serving as a handle therefore.

Fig. 7 is a sectional view of a fragmental portion of the casing and cartridge of a modified construction.

It is experienced in motor vehicle lubrication that particles of carbon or foreign matter accumulate in the oil supply which detrimentally act upon the machined surfaces of the engine of the motor vehicle and make desirable the frequent changing of the lubricating oil that this carbon accumulation may be kept at a minimum in the lubricating system. Oil filters have been used to remove the carbon particles from the lubricating oil, and in order to improve such filters, we have provided a removable cartridge within a casing which casing is permanently connected in the oil line at all times and is provided with a cover which carries as a unit a resilient spring for forcing the cartridge inwardly that it may seat and assist in directing the flow of oil therethrough and also has secured thereto as a part of the unit a clamping means for securing the cover in seating position; and the following is a detailed description of the present embodiment of this invention illustrating the preferred means by which these advantageous results may be accomplished.

With reference to the drawings, 10 designates the motor of a motor vehicle and 11 the dashboard back of this motor upon which an oil filter designated generally 12 is mounted and connected in the oil line to receive oil through the conduit 13 and return the same to the circulating system through the conduit 14. This filter more particularly comprises a casing 15 which is suitably shaped to provide an inwardly deflected portion 16 adjacent one end forming a seat for the cartridge, as will be presently described.

From this inwardly deflected portion 16 there extends the end wall 17 which extends outwardly as illustrated in Fig. 2 to form a chamber 18 in which there is located the discharge opening 19 from which extends the return pipe 14 as above mentioned. The other end of this casing is expanded outwardly to provide a radially extending portion 20 and a flange 21; the portion 20 forming on its inner surface a seat for the cover 22 which has a flange 23 within the flange 21 and is guided to position thereby, and between this cover and the seat 20 there is provided a gasket 24 against which pressure is applied for sealing the cover in closed position. The cover 22 is arched upwardly and over this cover there is positioned a yoke 25 having hook portions 26 to engage beneath the outer surface of the radially extending portion 20 which serves as an abutment. A screw 27 has threaded engagement with the eyes 29 formed on the yoke 25 and may be turned by the handle 28 to force the cover downwardly into seating position. The screw 27 is secured to the cover by a plate member 30 welded to the cover and provided with an opening to receive the neck portion 31 of the screw between the threaded portion thereof and the enlarged head 32 provided on the end of this screw and seated within the depressed portion 33 of the cover.

A cartridge 34 of substantially the same cross sectional shape as the casing and slightly smaller than the inner bore thereof is positioned within the casing and is centered by reason of the conical or bevelled portions 35 between the side walls thereof and the seat 16 so as to leave a peripheral chamber 36 about the cartridge and between it and the casing. This cartridge rests upon the gasket 37 on the seat 16 and is forced into engagement therewith by reason of a suitable resilient means which we have here shown in the form of a leaf spring 38 positioned between the cover 22 and a bracket 39 and suitably attached to the under surface of the cover so as to loosely engage therewith. The spring is centered with reference to the cover by reason of an opening 40 therein receiving the depressed portion 33 of the cover previously described.

This spring engages the top of the cartridge as shown in Fig. 2 and forces the same downwardly against the gasket and seat 16 to form a seal. The cartridge consists of a cylindrical body 41 upon the opposite ends of which there are positioned covers 42 and 43 to house within the cylindrical body a filtering material 44 of any suitable substance. The covers fit on the body 41 in which position they are soldered.

The entering opening to the casing is designated 47 and is located at some convenient point along the body of the casing above the seal formed by the seat 16. In use the entering oil will be conducted through the conduit 13 into the peripheral chamber 36 provided about the cartridge where it will rise and by its own pressure be forced through the cartridge, with its filtering material therein, into the chamber 18 and thence out through the conduit 14 returning the same to the circulating line.

In some instances instead of providing the spring 38 as a unit with the cover we may mount a spring 48 upon the cartridge as illustrated in Fig. 6 in such a manner that it forms a handle as well as the resilient means for forcing the cartridge into the casing. In this case the cover of the cartridge is struck up with strap 49 beneath which the spring 48 extends with a sufficient curvature to hold the same in place.

In Fig. 7 we have shown a modified bottom wall for the cartridge in which its edges 50 are bevelled or tapered and the casing is modified by reason of an extended bevel surface 51 inwardly from which a gasket 52 is mounted to be engaged by the bottom of the cartridge and to assist in this centering the cartridge the bottom may be depressed as at 53 in the center of its end wall to provide tapered portion 54 within the outwardly extended portion of the end wall and center the cartridge with reference thereto.

The foregoing description is directed solely towards the construction illustrated, but we desire it to be understood that we reserve the privilege of resorting to all the mechanical changes to which the device is susceptible, the invention being limited only by the terms of the appended claims.

We claim:—

1. In a liquid filter, an outer cylindrical casing providing a side wall and a bottom wall, the bottom wall extending inwardly from the side wall at substantially right angles thereto for a sufficient distance to provide a seat and the remainder and center portion of the bottom wall bulging downwardly, a cylindrical cartridge perforated only at its ends of a size to fit within said casing and having a flat end to fit said seat and leave a space between it and the downwardly bulging bottom wall of said casing, a cover for said casing, means acting between the cover and cartridge to cause the cartridge to form a liquid tight seal on said seat, said casing having a discharge opening in said bulging bottom wall and an entrance opening in said side wall for the passage of liquid therethru.

2. In a liquid filter, a casing providing side and bottom walls with the bottom wall extending inwardly from the side wall to provide a seat, a removable cartridge within said casing having an end portion providing a liquid-tight fit on said seat, the end portions of said cartridge being perforate and the intermediate side portions imperforate said cartridge and casing being of such relative size and shape as to provide chambers between them on either side of said seat, one of said chambers being partly along the side wall of the cartridge, a cover for said casing, a liquid conduit communicating with the chamber below said seat and an inlet liquid conduit independent of the cover communicating with the chamber above said seat and opposite said imperforate portion and below the perforate top of said cartridge.

3. In a liquid filter, a casing, a cartridge having perforate ends and an imperforate side in said casing of a size smaller than the interior of the casing to leave a space between the vertical walls of the cartridge and the casing, said cartridge having sealed engagement with the casing adjacent its lower end, an inlet opening in said casing connecting with said space and below the top of the cartridge to provide a trap in said space for the collection of sludge or the like.

4. In a liquid filter, a casing, a cartridge through which liquid is to be passed, said cartridge having an enclosing side wall and end walls carried by the side wall and forming with it a self-contained unit adapted for ready unitary insertion into and removal from the casing, having openings in portions respectively adjacent each of its ends with an imperforate wall between said end portions, a seal between the cartridge and casing and located intermediate one of the end portions having the openings and the imperforate wall of the cartridge, said cartridge between said seal and its other end being of a size smaller than said casing to leave a chamber between it and the casing, said chamber connecting with the openings in said other end of the cartridge, and an entrance opening through said casing opposite the imperforate wall of the cartridge and below the upper set of openings, whereby the entering liquid will be distributed over the openings in said other end portion, and means on the other side of the seal to discharge the liquid.

JOHN D. WICKS.
JOHN N. MOWERY.